(12) United States Patent
Chang et al.

(10) Patent No.: US 8,531,270 B2
(45) Date of Patent: Sep. 10, 2013

(54) COMMUNICATION DEVICE AND CONTROL METHOD THEREOF

(75) Inventors: Yu Tai Chang, Hsinchu Hsien (TW); Chia Sheng Peng, Hsinchu Hsien (TW); Shao Ping Hung, Hsinchu Hsien (TW); Chih Yu Chen, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 567 days.

(21) Appl. No.: 12/885,120

(22) Filed: Sep. 17, 2010

(65) Prior Publication Data

US 2011/0311000 A1    Dec. 22, 2011

(30) Foreign Application Priority Data

Jun. 17, 2010  (TW) ................................ 99119766 A (51) Int. Cl.
*G08B 5/22* (2006.01)

(52) U.S. Cl.
USPC ........... 340/7.34; 340/7.1; 340/7.2; 340/7.32; 340/7.33; 455/458; 455/515; 455/574; 370/311; 370/313; 708/5; 708/422; 708/423; 708/426

(58) Field of Classification Search
USPC ........ 340/7.1, 7.2, 7.32, 7.33, 7.34; 455/458, 455/515, 574; 370/311, 313; 708/5, 422, 708/423, 426
See application file for complete search history.

(56) References Cited

U.S. PATENT DOCUMENTS

| 6,389,574 | B1 * | 5/2002 | Belveze et al. | 714/795 |
| 6,765,893 | B1 * | 7/2004 | Bayley | 370/335 |
| 7,107,080 | B2 * | 9/2006 | Patel et al. | 455/574 |
| 7,158,795 | B2 * | 1/2007 | Zhang et al. | 455/452.2 |
| 7,630,701 | B2 * | 12/2009 | Sollenberger et al. | 455/343.3 |
| 2007/0036239 | A1 * | 2/2007 | Ma et al. | 375/316 |
| 2009/0075679 | A1 * | 3/2009 | Lin et al. | 455/458 |

FOREIGN PATENT DOCUMENTS

| CN | 101018377 A | 8/2007 |
| CN | 101389134 A | 3/2009 |

OTHER PUBLICATIONS

State Intellectual Property Office of the People's Republic of China, "Office Action", Apr. 16, 2013, China.

* cited by examiner

*Primary Examiner* — Jennifer Mehmood
*Assistant Examiner* — Andrew Bee
(74) *Attorney, Agent, or Firm* — WPAT, PC; Justin King (57) ABSTRACT

A communication device including a receiving unit and a signal processing module having a simulation unit and a decision unit is provided. The receiving unit receives a first burst of a paging message provided from a base station. Base on a reference burst code and an estimated channel impulse response of the communication channel, the simulation unit generates a simulation burst. The decision unit then determines if the paging message is a dummy message in accordance with the first burst and the simulation burst. The decision unit requests the receiving unit to stop receiving the paging message once the paging message is determined to be a dummy message.

23 Claims, 9 Drawing Sheets

| BIT INDEX | DUMMY PAGING MESSAGE CONTENT | | |
|---|---|---|---|
| | DECIMAL | BINARY | |
| 0 | 15 | 0001 | 0101 |
| 1 | 06 | 0000 | 0110 |
| 2 | 21 | 0010 | 0001 |
| 3 | 0'M' | 0000 | 0000 |
| | | | 0001 |
| | | | 0010 |
| | | | 0011 |
| 4 | 01 | 0000 | 0001 |
| 5 | 'F'0 | 0000 | 0000 |
| | | 1111 | |
| 6 | 2b | 0010 | 1011 |
| ⋮ | ⋮ | ⋮ | |
| 22 | 2b | 0010 | 1011 |

FIGURE 9

COMMUNICATION DEVICE AND CONTROL METHOD THEREOF

CROSS REFERENCE TO RELATED PATENT APPLICATION

This patent application is based on a Taiwan, R.O.C. patent application No. 099119766 filed on May 13, 2010.

FIELD OF THE INVENTION

The present disclosure relates to a communication system, and more particularly to a control method and associated communication device for detecting dummy paging messages.

BACKGROUND OF THE INVENTION

Current wireless communication systems transmit incoming call notifications through paging messages from the base stations to mobile communication devices within their coverage areas, such as the GSM. To maintain the synchronization between the base stations and the mobile communication devices, the base stations periodically transmit dummy paging messages that do not contain actual information. In fact, most of the messages sent from the base stations are dummy messages.

Figure 1:
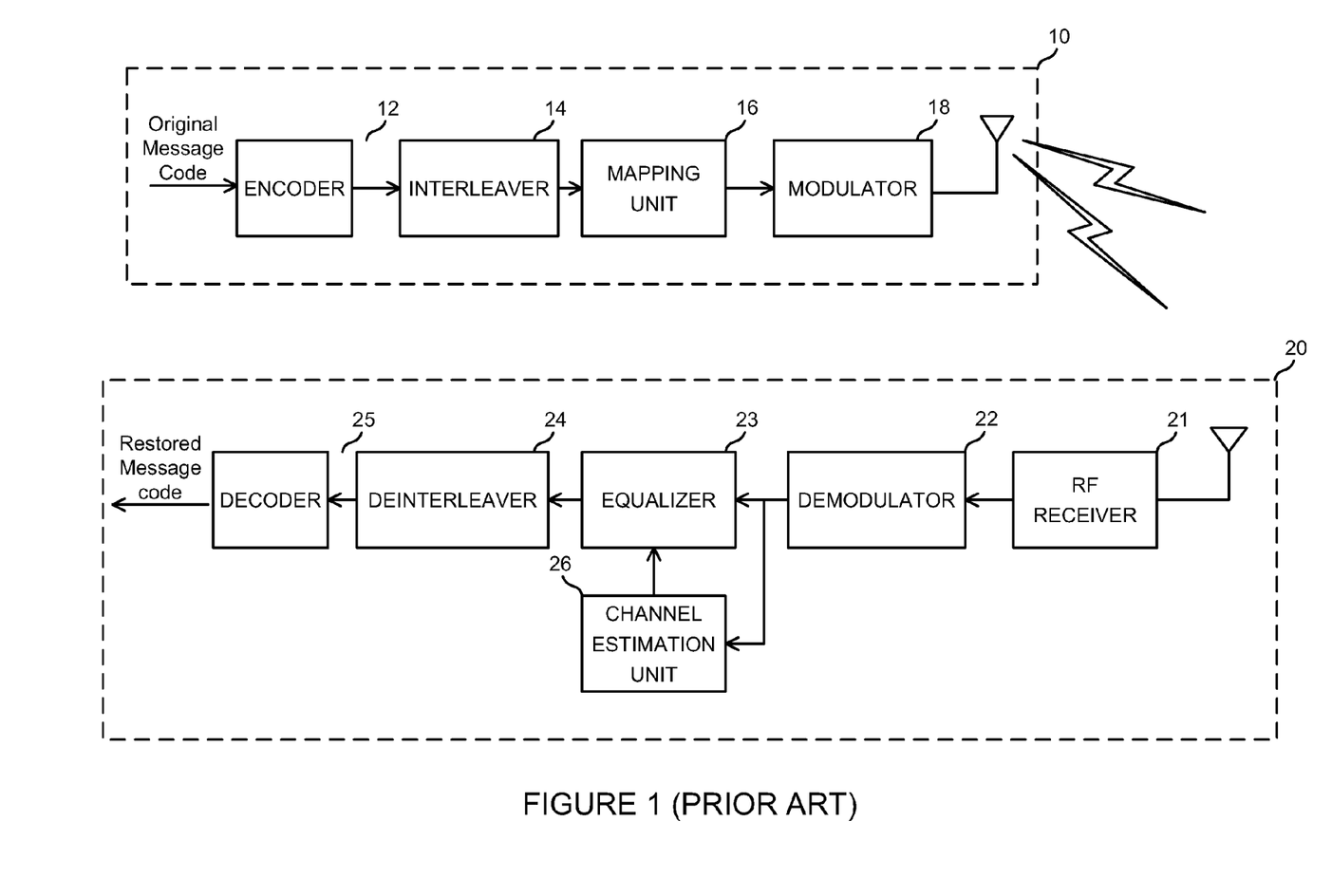
FIG. 1 depicts a functional block diagram of transmission and receiving ends of a communication system.

FIG. 1 illustrates a partial functional block of a communication system, wherein a transmission end 10 is a transmitter in a base station and a receiving end 20 is a receiver in a mobile communication system. In GSM systems, the original message code, of whether an actual paging message or a dummy message, contains 228 bits of information. The encoder 12 encodes the original message code into 456 bits of information through convolution coding at ½ bit rate. The interleaver 14 arranges the encoded information into four information bursts each representing 114 bits of information. The arranged bursts then are transmitted sequentially in a form of radio frequency (RF) signals after being mapped and modulated respectively by mapping unit 16 and modulation unit 18.

A receiving end 20 and an RF receiver 21 receive the corresponding signals from the four information bursts sequentially. The received signals are then restored into 228 bits of restored code after being demodulated by a demodulator 22, removed channel response by a channel equalizer 23, rearranged by a deinterleaver 24 and decoded by a decoder 25. The posterior circuit then determines if the resulted restored code is an actual paging message or a dummy message to proceed with corresponding processes. As shown in FIG. 1, the outputted signals from the demodulator 22 are also directed to a channel estimation unit 26, resulting necessary channel impulse response information for the channel equalizer 23.

In theory, the receiving end 20 determines if the paging message is a dummy message only or an actual message after having completely received all four information bursts and having them reconstructed into restored codes. However, if a paging message is determined as being a dummy message, it signifies that none of the four bursts contains actual message in regards to the call information. For a mobile communication device that emphasizes on the standby time, such unnecessary power spending for transmission of mass void information is considered intolerable.

SUMMARY OF THE INVENTION

Therefore, an object of the present invention is to provide a communication device and control method thereof for determining the validity of a paging message according to only a first out of four bursts through data characteristics of the bursts. If the paging message is verified as a dummy message, the receiver in the device selectively stops receiving signals of the following three bursts, and thus efficiently reducing power for receiving signals.

According to a preferred embodiment of the present disclosure, the communication device comprises a receiver, a simulation unit and a decision unit. The receiver receives a paging message wherefrom a first of four information bursts provided by a base station. The simulation unit forms a simulation burst according to a reference burst code and an estimated channel impulse response. The decision unit determines if the paging message is a dummy message according to the simulation burst and the first burst. When the paging message is determined to be a dummy message, the decision unit requests the receiver to stop receiving the paging message.

According to another preferred embodiment of the present disclosure, a control method applied to a communication device is provided. The method comprises: receiving a first burst of a paging message; forming a simulation burst in accordance with an estimated channel impulse response and a reference burst code, wherein the estimated channel impulse response is associated with the channel path of a signal; and requesting the device to stop receiving the paging message once the message is determined to be a dummy message in accordance with the simulation burst and the first burst.

The present disclosure may be extensively applied to all sorts of communication system for detecting dummy paging messages. The advantages and the essences of the present disclosure will be further detailed in the following attached figures and descriptions.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF THE PREFERRED EMBODIMENT

Figure 2:
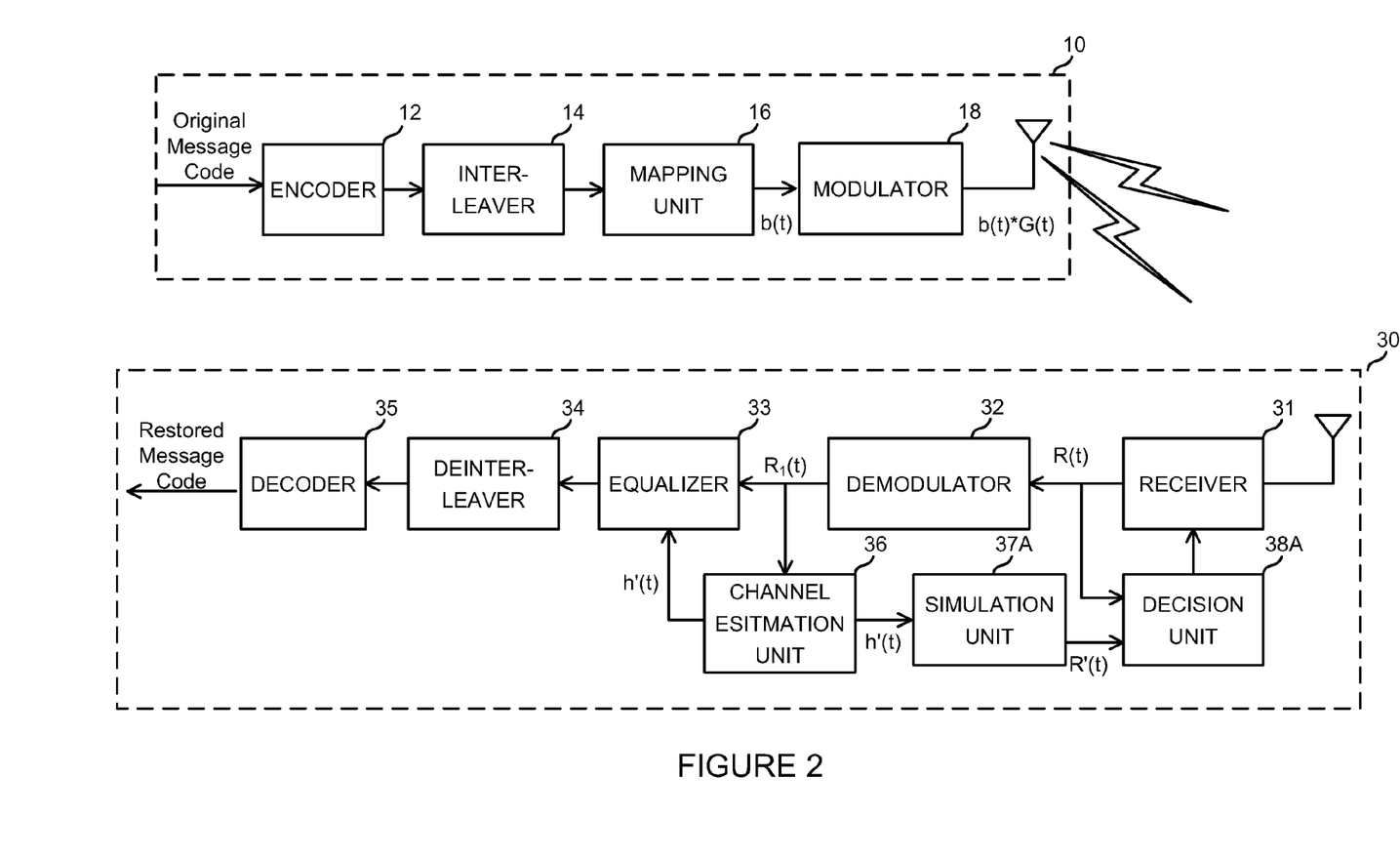
FIG. 2 depicts a functional block diagram of the communication device and the transmission end thereof, in accordance with a first preferred embodiment of the present disclosure.

FIG. 2 shows a functional block diagram of a communication device in accordance with a first embodiment of the disclosure. In this embodiment, a communication device 30 comprises a receiver 31, a demodulator 32, a channel equalizer 33, a deinterleaver 34, a decoder 35, a channel estimation unit 36, a simulation unit 37A, and a decision unit 38A. FIG. 2 also shows a corresponding transmission end 10 for transmitting paging messages. For example, the transmission end 10 is a base station of a service provider, whereas the communication device 30 represents a built-in chip in a mobile phone or the mobile phone itself. Moreover, the demodulator 32, the channel estimation unit 36, the simulation unit 37A and the decision unit 38A may be integrated within a signal processing module.

Regardless whether the message is an actual paging message or a dummy paging message, a first burst of an original burst code at an output of a mapping unit 16 is denoted as b(t), and signals modulated by the modulator 18 are denoted as b(t)*G(t). For example, G(t) may correspond to either the Gaussian minimum-shift keying (GMSK), or the Differential phase-shift keying (DPSK), both of which are modulation processes of different types. Moreover, a channel impulse response between the transmission end 10 and the communication device 30 is denoted as h(t). A received result of the first burst at an output end of the receiving unit 31 is represented as R(t)=b(t)*G(t)⊗h(t), where ⊗ denotes the convolution process.

The channel condition h(t) is time and location variant. Thus, to compensate for distortions due to various channel effects in the transmission, the channel estimation unit 36 estimates h(t) in accordance with a demodulated burst $R_1(1)$ from demodulating received signal R(t) to generate an estimated channel impulse response h'(t) and then provides h'(t) to the channel equalizer 33 and simulation unit 37A for reference. To enhance the estimation accuracy of h'(t), in practice, a training sequence may be included in data frames as a reference for channel estimation unit 36 to generate the estimated channel impulse response h'(t).

As shown in FIG. 2, the estimated channel impulse response h'(t) is also to be transmitted to the simulation unit 37A. Due to the already established format and contents of the dummy paging message in communication system specifications, theoretical message code of a dummy paging message derived is in advance stored in the communication device 30. The simulation unit 37A then uses this theoretical message code as the reference burst code $b_1(t)$, and generates a simulation burst R'(t) according to the reference burst code $b_1(t)$ and the estimated channel impulse response h'(t). According to an embodiment of present disclosure, the simulation unit 37A first modulates the reference burst code $b_1(t)$ using the same modulation process used in the modulation unit 18 to produce a modulated burst code $b_1(t)$*G(t), and then convolves the modulated burst code $b_1(t)$*G(t) with the estimated impulse response h'(t) to form the simulation burst R'(t)=$b_1(t)$*G(t)⊗h'(t).

The first burst of an actual paging message is different from that of a dummy paging message. Although there may be a slight discrepancy between the estimated channel impulse response h'(t) and the actual channel impulse response h(t), the comparision between the burst R'(t) and received first burst R(t) will determine whether the current received first burst R(t) corresponds to the first burst of the dummy paging message. If the current received first burst R(t) is from an actual paging message, the difference between the simulation burst R'(t) and the first burst R(t) shall be much greater. Thus, the decision unit 38A is able to determine if the paging message is a dummy paging message by comparing the received first burst R(t) outputted from the receiving unit 31 with the simulation burst R'(t). When the paging message is determined to be a dummy paging massage, the decision unit 38A then requests the receiving unit 31 to stop receiving subsequent bursts (of the paging message) following the first burst and thus saving energy. In practice, the receiving unit 31 may include circuitries such as RF modules and analog to digital converters (ADC).

G(t) is usually known and fixed. Thus, according to the simulation unit 37A of present disclosure, $b_1(t)$*G(t) in the simulation burst R'(t) may be pre-computed and stored in a memory to avoid repeated computation. In other words, the simulation unit 37A is able to produce the simulation burst R'(t) by convolving the estimated impulse response h'(t) with $b_1(t)$*G(t) saved in the memory.

Figure 3:
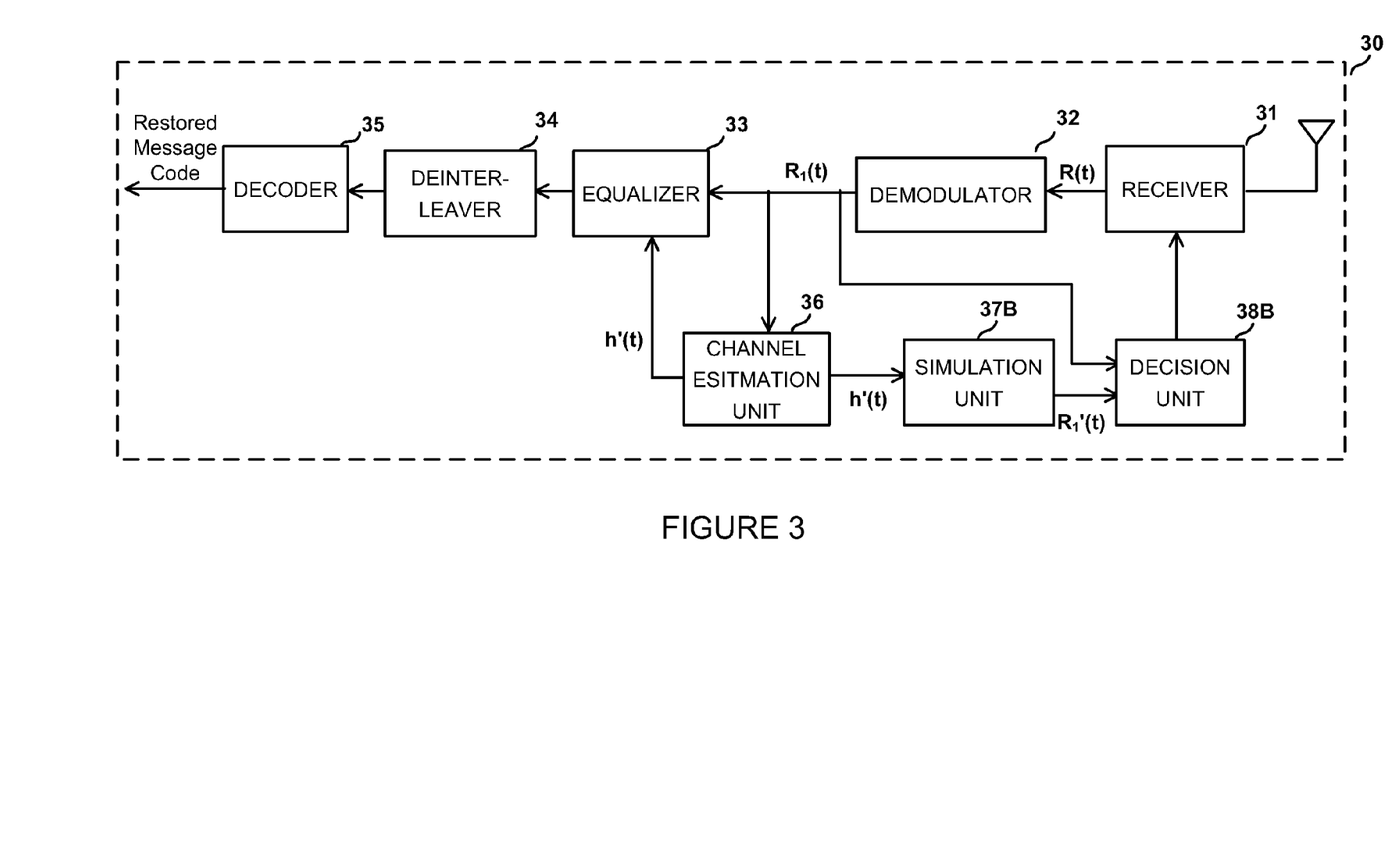
FIG. 3 shows the functional block diagram of a communication device in accordance with a second preferred embodiment of the present disclosure.

FIG. 3 illustrates a functional block diagram of a communication device in accordance with a second embodiment of the disclosure. One main difference between the second and the first preferred embodiment lies in the simulation unit and the decision unit. In the second preferred embodiment, a simulation unit 37B convolves the estimated channel impulse response h'(t) with the reference burst code $b_1(t)$ to simulate the simulation burst $R_1'(t)=b_1(t)$⊗h'(t). A decision unit 38B then compares the simulation burst $R_1'(t)$ with the demodulated burst $R_1(t)$ to determine if the particular paging message is a dummy paging message.

Theoretically speaking, the demodulated $R_1(t)$ is equivalent to b(t)⊗h(t). If the current first burst R(t) corresponds to the first burst of a dummy paging message, then the demodulated burst $R_1(t)$ and the simulation burst $R_1'(t)$ in this embodiment shall be fairly close. And once the decision unit 38B senses the correlation between the simulation burst and demodulated burst exceeds a predetermined threshold, the decision unit 38B requests the receiver 31 to stop receiving the three subsequent bursts to reduce the power consumption.

The following are descriptions of several preferred embodiments of present disclosure relating to the decision methods adopted by decision unit 38A. The following decision methods, also applicable to the decision unit 38B, may be applied once the simulation burst R'(t) and the first burst R(t) are substituted by the simulation burst $R_1'(t)$ and the demodulated burst $R_1(t)$.

N is a positive integer. Assume the simulation burst R'(t) contains N simulation bits, and the first burst R(t) contains N actual bits. Then, the decision unit 38A correlates the N simulation and actual bits to form N correlation indices C(t). To satisfy the GSM standard, N equals 114 and t is an integer between 1 and 114. The decision unit 38A may computes C(t)=R(t)*conj(R'(t)) between the simulation bit and the actual bit for every t to respectively generate 114 correlation indices, where conj(R'(t)) is the conjugate of R'(t).

Considering an ideal case when the noises and various channel effects are neglected, and assuming the received first burst R(t) and the simulation burst R'(t) are equal, for example, R(t)=R'(t)=a+bj, then correlation indices C(t) corresponding to each t is equal to:

$$C(t)=R(t)*\mathrm{conj}(R'(t))=(a+bj)\cdot(a-bj)=a^2+b^2$$

On a two-dimensional plane with a horizontal axis as the real part and a vertical axis as an imaginary part, the computation result of the above equation falls on a positive real part. Moreover, the closer the values of R(t) and R'(t) get, the closer the correlation between the two is to $a^2+b^2$, where $a^2+b^2$ is the maximum. On the contrary, when the first burst R(t) and simulation burst R'(t) are at maximum difference where R(t)=a+bj and R'(t)=−a−bj, the correlation result becomes −($a^2+b^2$) which is a negative real number. It is to be noted that coefficients a and b are both functions of t.

Due to noise distortions and possible channel estimation errors, the simulation burst R'(t) and the first burst R(t) are usually not exactly the same even if the first burst R(t) corresponds to a dummy paging message. The correlation indices C(t) may be randomly distributed in any of the four quadrants or on either axis in a 2D coordinate containing a real horizontal axis and an imaginary vertical axis. In one of the preferred embodiments, the decision unit 38A normalizes each correlation index for bounding the real part of the indices between 1 and −1, to avoid any misjudgments caused by different range values of the first burst R(t) and simulation burst R'(t).

Figure 4:
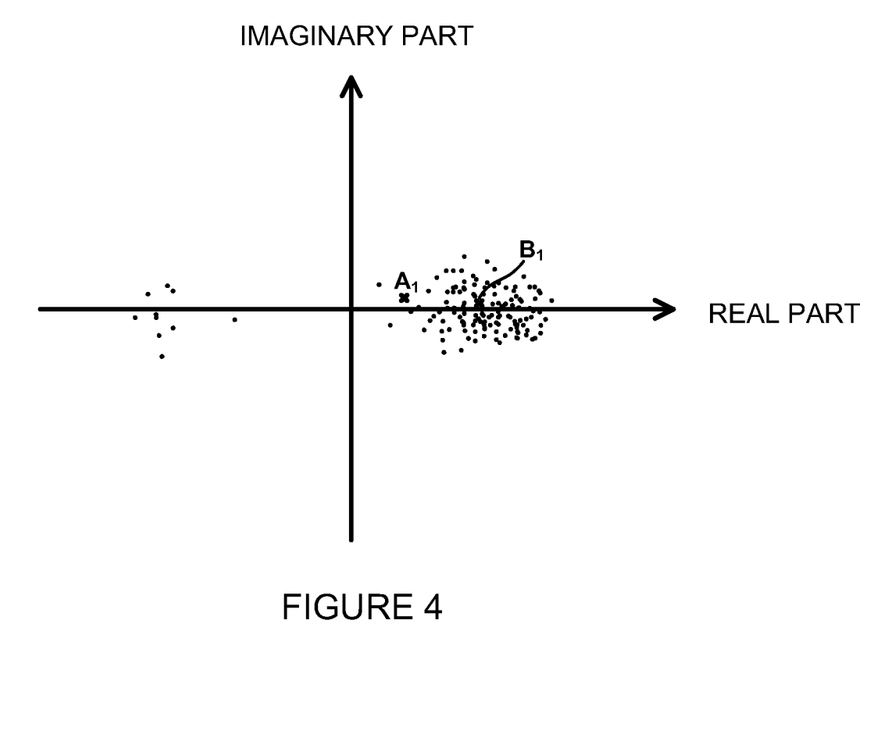
FIG. 4 shows an example of a distribution of correlation indices in a 2D coordinate consisting a real axis and an imaginary axis in vertical and horizontal directions respectively.

The decision unit 38A forms a first correlation ratio in accordance with the following formulas:

$$A_1 = \frac{\sum_{t=1}^{N} C(t)}{N},$$

$$B_1 = \frac{\sum (C(t)|_{real(C(t))>0})}{N_{real>0}},$$

$$X_1 = \left|\frac{A_1}{B_1}\right|.$$

Wherein $N_{real>0}$ is the number of calculated N correlation indices with positive real parts, and $A_1$ and $B_1$ are reference parameters result from calculation of the correlation indices C(t) for determining the closeness between the simulation burst and the first burst. FIG. 4 provides a graphical example of the distribution of correlation indices each having a real part in a horizontal axis and an imaginary part in a vertical axis. As described above, if the received first burst R(t) corresponds to the first burst of a dummy paging message, the simulation burst R'(t) and the first burst R(t) shall be fairly close. Under such circumstances, the N correlation indices are then distributed mainly on the right half plane of the coordinate system in FIG. 4. On the contrary, if the first burst received by the communication device 30 corresponds to an actual paging message R(t), then the distribution of the N correlation indices computed by the simulation burst R'(t) and the first burst R(t) are mainly distributed in the left half plane and also more inclined to the left.

When all of the N correlation indices fall on the right half plane, then $A_1$ equals $B_1$, or otherwise, $A_1$ is less than $B_1$. Once anyone of the correlation indices falls within the left half plane, $A_1$ is smaller than $B_1$. Accordingly, the higher the first correlation ratio $X_1$ is, the less difference there is between $A_1$ the and $B_1$, and thus, the less effect there is to the overall mean value of the correlation indices caused by the indices distributed in the left half plane. In other words, the higher the value of $X_1$ is, the less difference there is between the simulation burst R'(t) and the first burst R(t). According to the present disclosure, the decision unit 38A is able to determine if the paging message is a dummy paging message by comparing if the first correlation ratio $X_1$ is greater than a first threshold. If $X_1$ is greater, then the first burst R(t) is determined to be the corresponding dummy paging message.

In practice, the first threshold is predetermined base on the channel conditions, statistics, or other simulation methods and may be pre-stored in the decision unit 38A. In other preferred embodiments of the present disclosure, the decision unit 38A may produce $X_1$ ratios differently, and thus uses the same or different thresholds for comparison. For example, the decision unit 38A may take the real parts of the ratio between $A_1$ and $B_1$, or the ratio between the real parts of $A_1$ and $B_1$, to generate $X_1$. Alternatively, the decision unit 38A may also compute the square of the ratio between the $A_1$ and $B_1$ (i.e., the energy of $X_1$) to determine if the first burst R(t) corresponds to the dummy paging message by determining if the square of the ratio between the two exceeds a threshold.

The decision unit 38A may also form a second correlation ratio in accordance with the following formulas to determine if the paging message is a dummy paging message:

$$A_{21} = \frac{\sum (C(t)|_{real(C(t))<0\ \&\ img(C(t))>0})}{N_{real<0\ \&\ img>0}},$$

$$A_{22} = \frac{\sum (C(t)|_{real(C(t))<0\ \&\ img(C(t))<0})}{N_{real<0\ \&\ img<0}},$$

$$B_{21} = \frac{\sum (C(t)|_{real(C(t))>0\ \&\ img(C(t))>0})}{N_{real>0\ \&\ img>0}},$$

$$B_{22} = \frac{\sum (C(t)|_{real(C(t))>0\ \&\ img(C(t))<0})}{N_{real>0\ \&\ img<0}},$$

$$X_2 = \left|\frac{A_{21} + A_{22} + B_{21} + B_{22}}{B_{21} + B_{22}}\right|,$$

Wherein $N_{real<0\&img>0}$ is the number of calculated N correlations indices with a negative real part and a positive imaginary part, similarly $N_{real<0\&img<0}$ is the number of indices with both negative real and imaginary parts, $N_{real>0\&img>0}$ is the number of indices with both positive real and imaginary parts, and $N_{real<0\&img<0}$ is the number of indices with a positive real part and a negative imaginary part. $A_{21}, A_{22}, B_{21}, B_{22}$ are reference parameters calculated using the correlation indices C(t) for determining the closeness between the simulation burst and the first burst. This determination method calculates the mean of the correlation indices respectively distributed in each of the four quadrants. The closer the value of $X_2$ is to 1, the less the difference there is between the simulation burst R'(t) and the first burst R(t). Thus, the decision unit 38A is able to determine if the paging message is a dummy paging message by comparing if $X_2$ is greater than the second threshold. If $X_2$ is greater than the second threshold value, then the first burst R(t) is determined to be a dummy paging message.

The decision unit 38A may also use the real part of the ratio between $A_{21}+A_{22}+B_{21}+B_{22}$ and $B_{21}+B_{22}$ instead of the absolute value of the ratio of the two to calculate $X_2$. Alternatively, the decision unit 38A may also use the square value of the ratio between the $A_{21}+A_{22}+B_{21}+B_{22}$ and $B_{21}+B_{22}$ (i.e. the energy of $X_2$) to determine if the first burst R(t) is in correspondence with the dummy paging message by comparing if the square value of the ratio between the two is greater than a threshold value.

In practice, besides the two already mentioned methods, the decision unit 38A may also determine if the paging message is a dummy paging message by comparing if the number of correlation indices with positive real part is greater than a third threshold. To reduce estimation errors caused by the channel fading due to different channel conditions, the fourth threshold value may be designed in accordance with the corresponding channel fading level. For example, the decision unit 38A may adjust the fourth threshold according to the estimated channel impulse response h'(t).

According to the present disclosure, the decision unit 38A may also form a third correlation ratio in accordance with the following formulas to determine if the paging message is a dummy paging message:

$$A_3 = \frac{\sum (C(t)|_{real(C(t))<0})}{N_{real<0}},$$

$$B_3 = \frac{\sum (C(t)|_{real(C(t))>0})}{N_{real>0}},$$

$$X_3 = \left|\frac{A_3 + B_3}{B_3}\right|,$$

Wherein $N_{real<0}$ and $N_{real>0}$ are the numbers of calculated N correlation indices with negative and positive real part respectively. $A_3$ and $B_3$ are reference parameters calculated using the correlation indices C(t). This method determines the mean of correlation indices laid within left and right half plane of the coordinate system separately. The closer the $X_3$ is to 1, the less the difference there is between the first burst R'(t) and the simulation burst R(t). Therefore, the decision unit 38A determines if the paging message is a dummy paging message by comparing if $X_3$ is greater than a fifth threshold. If $X_3$ is greater than the fifth threshold, the first burst R(t) is determined to be the corresponding paging message.

Similarly, the decision unit 38A may compute the real part of a ratio between $A_3+B_3$ and $B_3$ instead of calculating the absolute value to form $X_3$. The decision unit 38A may also determine whether the first burst R(t) corresponds to a dummy paging message by comparing if the square (the energy of the third correlation ratio $X_3$) of the computed ratio is greater than a threshold value.

Figure 5A:
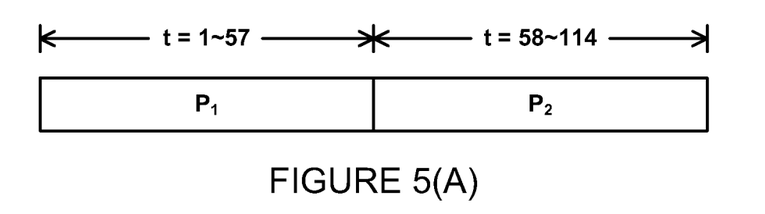
FIG. 5(A)~(C) illustrate first and second sections in accordance with a preferred embodiment of the present disclosure.
Figure 5B:
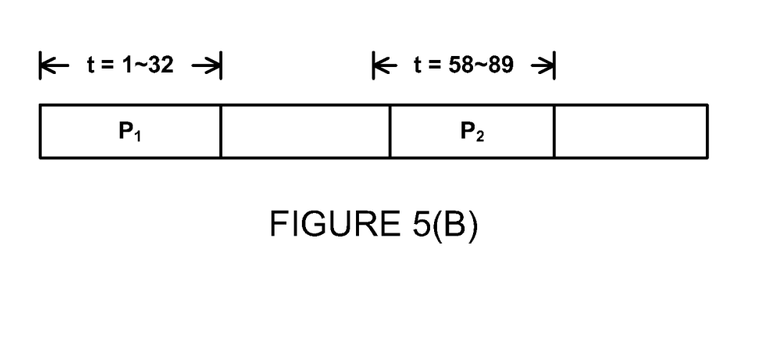
Figure 5C:
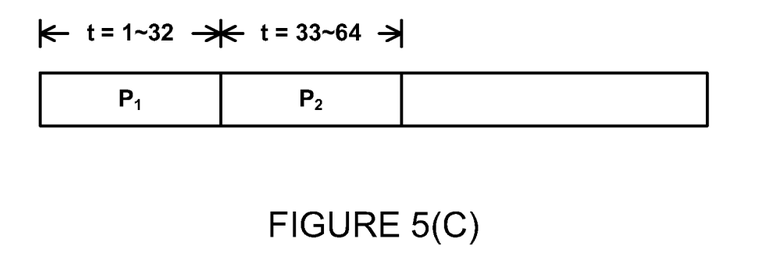

The decision unit 38A may also form a fourth correlation ratio in accordance with the following formulas to determine if the paging message is a dummy paging message:

$$X_4 = \left|\frac{\max(S_1, S_2)}{\min(S_1, S_2)}\right|$$

Where $S_1$ and $S_2$ are respectively the sums of the correlation indices in a first section $P_1$ and a second section $P_2$ from the N correlation indices. FIG. 5 (A) to (C) depict three examples of the first and second section of a GSM compliant paging message. In FIG. 5(A), the first 57 correlation indices (t=11~57) of a total of 114 indices are sectioned in $P_1$ and the subsequent 57 indices are sectioned in $P_2$. In FIG. 5(B), t=1~32 correspond to 32 correlation indices sectioned in $P_1$, and t=58~59 correspond to another 32 correlation indices section in $P_2$. In FIG. 5(c), t=1~32 correspond to 32 correlation indices sectioned in $P_1$, and t=33~64 correspond to another 32 correlation indices section in $P_2$.

As previously mentioned, if the first burst R(t) corresponds to a first burst of a dummy paging message, the simulation burst R'(t) and the first burst R(t) shall be fairly close, and thus means of the N correlation indices C(t) in different sections shall also be close. In the other words, if the first burst R(t) corresponds to the dummy paging message, then $S_1$ and $S_2$ shall be fairly close. The larger the fourth correlation ratio $X_4$ gets, the greater the difference there is between $S_1$ and $S_2$. The decision unit 38A is able to determine if the paging message is a dummy paging message by comparing if $X_4$ is greater than a sixth threshold. If $X_4$ is greater than the sixth threshold, then the first burst R(t) is determined not as part of a dummy paging message, and thus the receiver 31 will not be requested to stop receiving the subsequent paging message burst.

Similarly, the decision unit 38A may also be used to calculate the ratio between the real part of $\max(S_1,S_2)$ and $\min(S_1,S_2)$, instead of using the absolute values to form $X_4$.

Alternatively, the decision unit 38A can also determine if the first burst R(t) is the corresponding dummy paging message by comparing if the square of the ratio between $\max(S_1,S_2)$ and $\max(S_1,S_2)$ is greater than a threshold. In addition, the first section $P_1$ and the second section $P_2$ may have partially overlapped sections.

It is to be noted that, the various thresholds may vary under different channel conditions, or vary in accordance with a specific value (e.g. an absolute value or a square value) obtained from correlation ratios generated from different computation methods. In a preferred embodiment of the present disclosure, the decision unit can dynamically adjust the threshold based on present channel conditions acquired from training sequence by the channel estimation unit. In particular, if present channel conditions are good (e.g. the signal to noise ratio is greater than a certain value or within a range), the threshold is adjusted to a higher level for a stricter standard; in contrast, the threshold is adjusted to a lower level if present channel conditions are less satisfactory (e.g. the signal to noise ratio is smaller than a certain value or within a range). In operation, the method of dynamically adjusting the threshold, without trading off an overall decision rate, enables the decision unit to achieve a higher accuracy to avoid misjudgments due to similar but non-target bursts.

According to the present disclosure, the decision unit 38A may utilize any one of the described correlation ratios as a decision reference, or select two or more of the described correlation ratios as composite evaluation conditions. For example, the decision unit 38A may be designed in a way that it only requests the receiving unit 31 to stop receiving the subsequent bursts when the numbers of the first correlation ratio, second correlation ratio, and the correlation indices with positive real part are all greater than their corresponding thresholds.

For example, assuming the third threshold value that is used for comparing with the number of correlation indices with a positive real part is equal to 20. Further assuming that 10 (out of 114) correlation indices C(t) result from computation of the first burst R(t) and the simulation burst R'(t), have positive real part, then even if the first correlation ratio $X_1$ (computed using the first burst R(t) and the simulation burst R(t)) is greater than the first threshold value, the decision 38A still will not determine the received first burst R(t) is from a dummy paging message.

For another example, assuming the third threshold value that is used for comparing with the number of correlation indices with a positive real part is equal to 10. And further assuming that only 5 out of the 114 correlation indices of the first burst R(t) and the simulation burst R'(t) fall within the left half plane, then even if the first correlation ratio $X_1$ of the first burst R(t) and the simulation burst R'(t) is less than the first threshold, the decision unit 38A shall still decide the received first burst R(t) to be a dummy paging message. A preferred embodiment of the present disclosure comprises a signal processing module comprising a simulation unit (37A or 37B) and a decision unit (38A or 38B). Such signal processing module may be utilized in conjunction with several other communication chip modules to help determine if a paging message is a dummy message and to provide suggestions to the communication chip whether to stop receiving the subsequent bursts.

Figure 6:
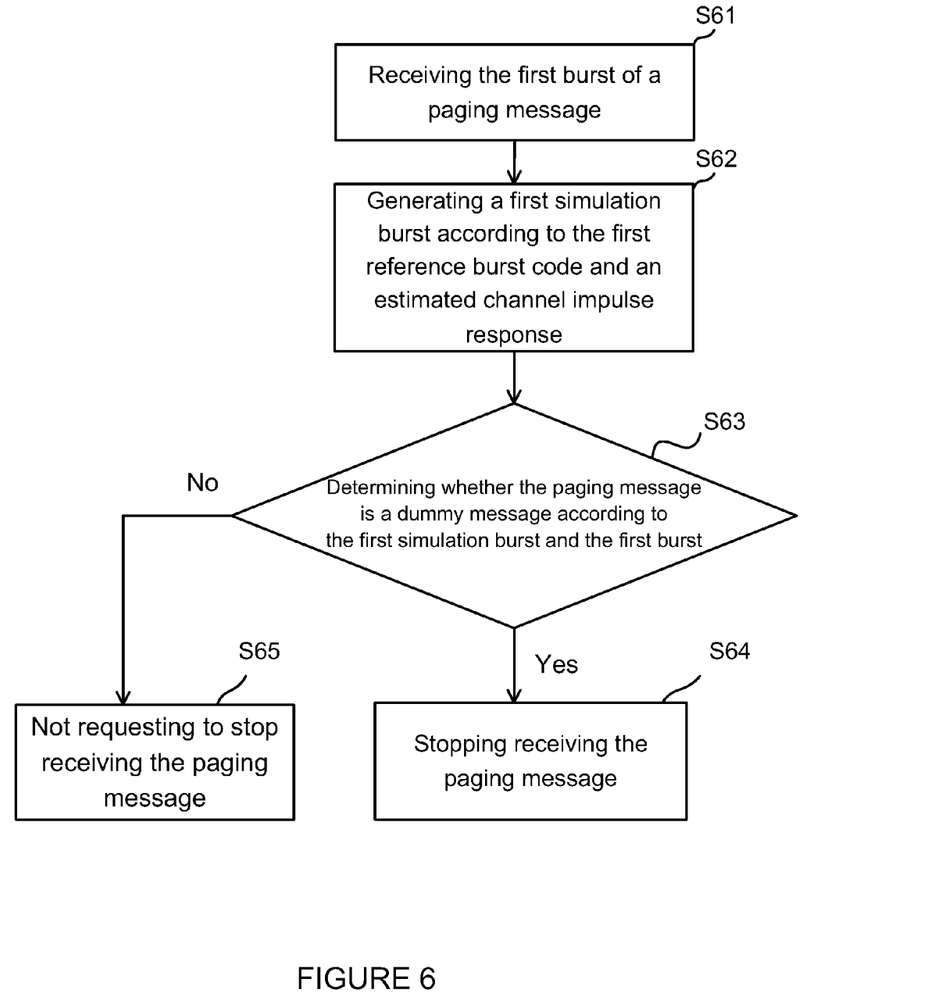
FIG. 6 shows a flow chart of a control method mentioned in accordance with a third embodiment of the present disclosure.

According to a third preferred embodiment of the present disclosure, a control method applied to a communication device is provided. FIG. 6 depicts a flow chart of control method. The method begins with receiving the first burst of a paging message in Step S61. Step S62 includes generating a first reference burst code and an estimate channel impulse response in accordance with a first reference burst, wherein the estimated channel impulse response is associated with a channel path. Step S63 is performed for determining whether the paging message is a dummy paging message according to the first simulated burst and the received first burst. If the determination is positive in Step S63, the communication devise then shall be requested to stop receiving the paging message in Step S64, or else no requests shall be sent to the communication devices for stop receiving the paging message in Step S65 as shown in the figure.

In the control method of the present disclosure, the first simulation burst formed in step S62 may be $R'(t)=b_1(t)*G(t)\otimes h'(t)$ or $R_1'(t)=b_1(t)\otimes h'(t)$ as previously described. The decision methods and standards that may be adopted by step 63 are same as the methods that are adopted in the communication device according to the previous embodiments of the present disclosure, and thus shall not be further described here. Moreover, in operation, after step S65, the control method of the present disclosure can further determine if a paging message is a dummy paging message according to the subsequent bursts thereof.

Figure 9:
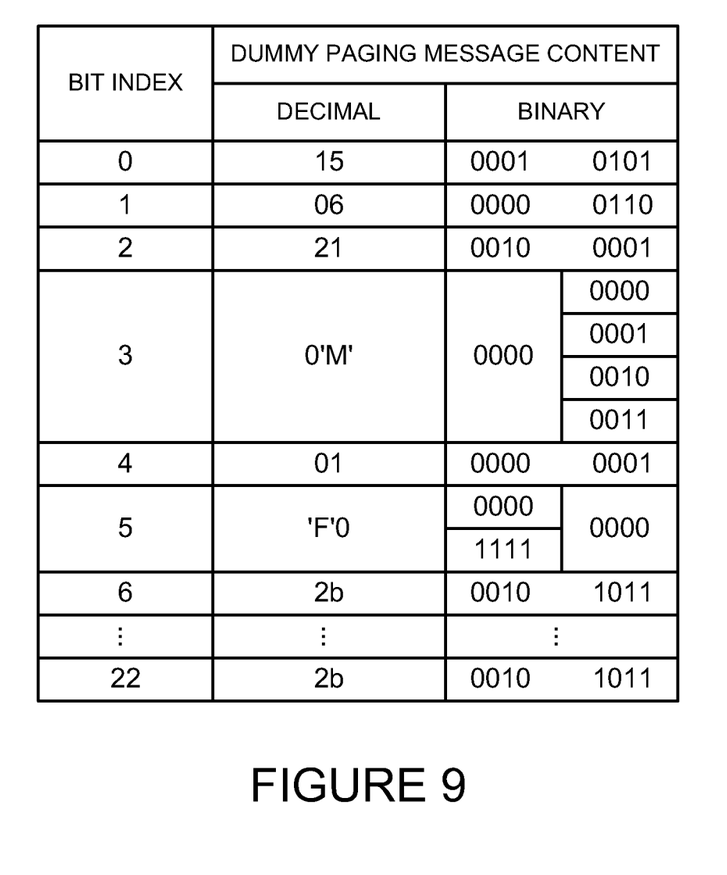
FIG. 9 illustrates data contents of a simulated paging message in a system in accordance with a preferred embodiment.

In practice, the communication device and the control methods of the present disclosure may consider more than one type of simulation burst. FIG. 9 depicts the data contents in a dummy paging message. As shown in FIG. 9, in the corresponding $5^{th}$ data byte, the F value may be 0000 or 1111, meaning that there are two possible data contents for the original burst code b(t) of a dummy paging message in the GSM system. With the control method and the communication device of the present disclosure, two different simulation bursts R'(t) may be produced respectively for the two possible cases above.

Figure 7:
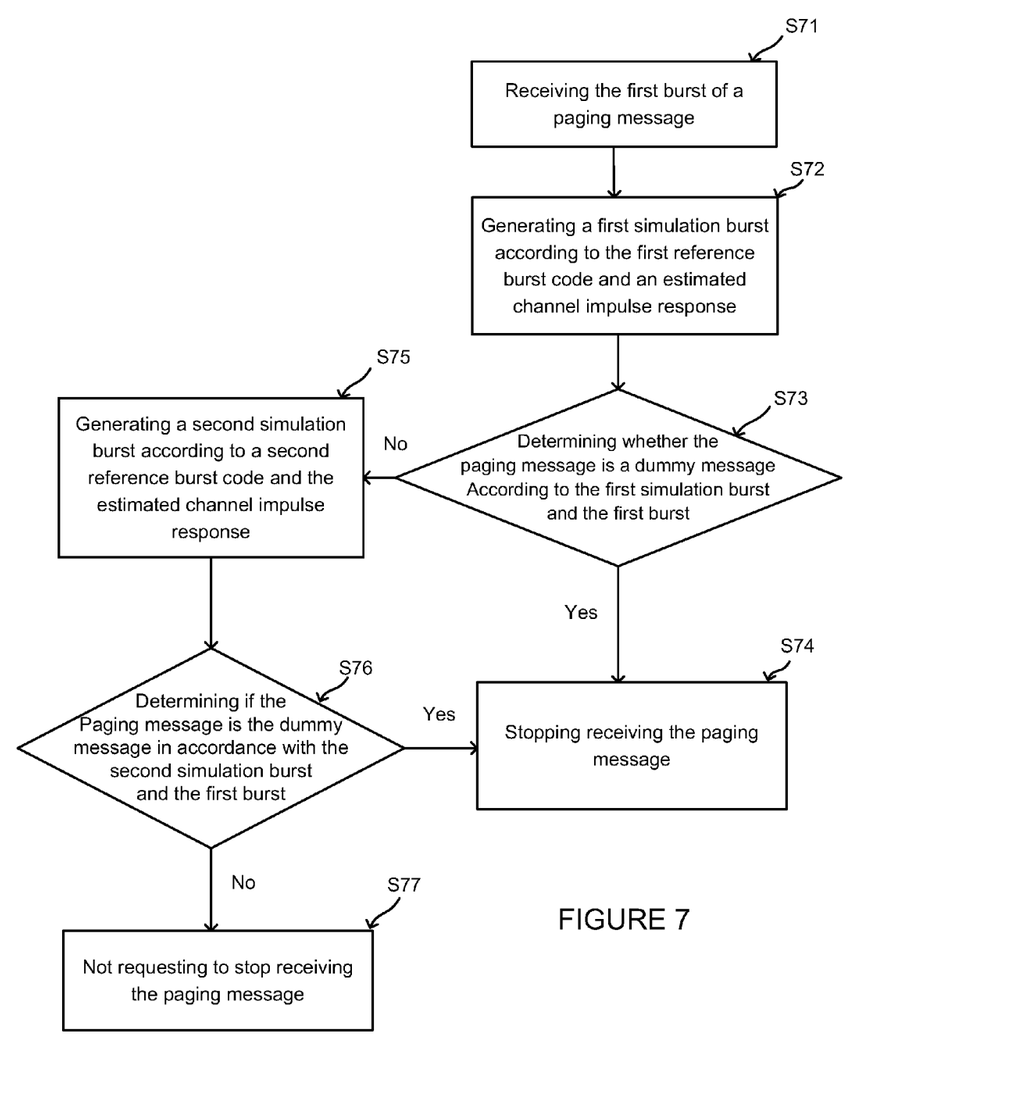
FIG. 7 and FIG. 8 show flowcharts of two possible types of simulation bursts in accordance with a preferred embodiment of the present disclosure.

FIG. 7 illustrates a flow chart implementing the idea mentioned above. The method begins with receiving the first burst of a paging message in Step S71. Step S72 includes forming a first reference burst code and an estimated channel impulse response. Then Step S73 is performed for determining whether the paging message is a dummy paging message according to the first simulated burst and received first burst. As shown in FIG. 7, if the determination is negative in Step S73, Step S75 is performed to form a second simulation burst according to a second reference burst code and the estimated channel impulse response. The first and second reference burst code correspond to two different original burst codes b(t) of a dummy paging message, respectively. Step S76 is performed to determine if the paging message is a dummy paging message according to the second simulation burst and the first burst. If the determination is positive in Step S73 or Step S76, the communication device then shall stop receiving the paging message in Step S74; or if the determination result is negative in Step S76, no requests shall be sent to the communication devices for stop receiving the paging message in Step S77. Further note that the step S72 and the step S75 may be performed simultaneously, and so is for step S73 and step S76.

Furthermore, the device and the control method of the present disclosure may compare bursts more than the first burst. For example, a simulation burst may utilize the first two bursts of a paging message to form the simulation burst and proceed to respective comparison afterwards. And once a burst of the first two bursts is determined to be a dummy message, the communication device may stop receiving the subsequent bursts according to the control method described in the present disclosure.

Figure 8:
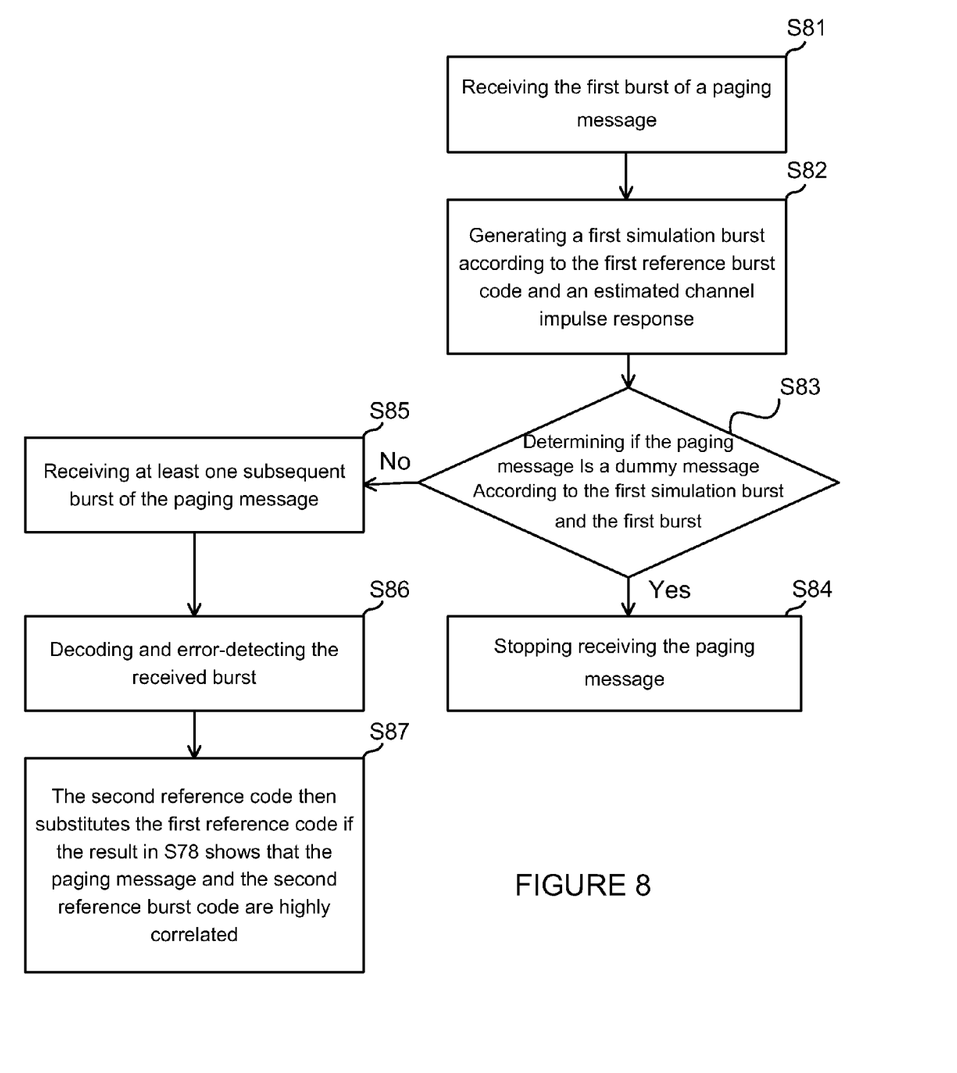

FIG. 8 is a flow chart of the preferred embodiment implementing the ideas described above. Steps S81 to S84 in FIG. 8 are the same as corresponding steps S71 to S74 described in the previous embodiment shown in FIG. 7, and will not be further explained for brevity. In this embodiment, in Step 86 following Step S85, each received burst is decoded and error detected. Then, Step S87 includes selectively adjusting a reference burst code to be used in next received paging message according to the result of decoding and error detecting in the previous step. More specifically, if the decoding and the detection results in Step S87 show that the paging message and the second reference burst code are highly correlated, the second reference code then substitutes the first reference code in Step S87. In other words, the method is to form the simulation burst for comparison using the second reference burst instead of the first reference burst for the next received paging message.

Compared to the embodiment illustrated in FIG. 7, in the control flow illustrated in FIG. 8, the first burst of a paging message only needs to be compared with the simulation burst formed by some reference bursts from a paging message. The advantage of such method is that the time and resources are saved during each comparison whereas a disadvantage is that a dummy paging message corresponding to another reference burst code may not be identified. Thus, Step S87 is performed for adjusting a reference burst code to reduce the possibility of missing a dummy paging message corresponding to another reference burst code in a next round.

As described above, this disclosure provides a communication and a control method thereof for determining a validity of a paging message in accordance with on a first of four bursts through data characteristics of the bursts. When the paging message is determined to be a dummy paging message, the communication device stops receiving signals from the three subsequent bursts to achieve an overall more efficient device in terms of power and processing speed. The concepts in present disclosure may be extensively applied to various types of communication system involving dummy paging messages.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A communication device, applied to a communication system having a base station, the communication device comprising:

a receiver, for receiving a first burst of a paging message transmitted from the base station;

a signal processing module, comprising:

a simulation unit, for generating a simulation burst according to a reference burst code and an estimated channel impulse response associated with a communication channel for propagating the paging message; and a decision unit, for determining whether the paging message is a dummy paging message according to the simulation burst and the first burst, wherein the decision unit correlates the simulation burst and the first burst to generate a plurality of correlation indices to determine whether the paging message is the dummy paging message;

wherein, the decision unit instructs the receiver to stop receiving the paging message when the paging message is determined as the dummy paging message, and wherein C(t)=R(t)*conj(R'(t)), C(t) is the correlation indices, R(t) is the first burst, and R' (t) is the simulation burst.

2. The communication device according to claim 1, wherein the simulation unit modulates the reference burst code to generate a modulated burst code, and convolves the modulated burst code with the estimated channel response to generate the simulation burst; and the decision unit determines whether the paging message is the dummy paging message by comparing the simulation burst and the first burst.

3. The communication device according to claim 1, wherein the signal processing module further comprises:
a demodulation unit, for demodulating the first burst to a demodulated burst;
wherein, the simulation unit convolves the reference burst code with the estimated channel impulse response to generate the simulation burst, and the decision unit determines whether the paging message is the dummy paging message by comparing the simulation burst and the first burst.

4. The communication device according to claim 1, wherein the signal processing module further comprises:
a channel estimation unit, for generating the estimated channel impulse response according to a training sequence in the paging message.

5. The communication device according to claim 1, wherein the simulation burst comprises a plurality of simulation bits, and the first burst comprises a plurality of actual bits; and the decision unit correlates the plurality of simulation bits and the plurality of actual bits to generate the plurality of correlation indices, and determines whether the paging message is the dummy paging message according to the plurality of correlation indices.

6. The communication device according to claim 5, wherein the decision unit determines whether the paging message is the dummy message according to a correlation ratio obtained from the correlation indices, and the correlation ratio is determined by a plurality of closeness parameters, wherein the plurality of closeness parameters includes an average for a part of the correlation indices.

7. The communication device according to claim 6, wherein the decision unit determines whether the paging message is the dummy message by comparing whether a number of correlation indices with a positive real part is greater than a threshold.

8. The communication device according to claim 6, wherein the decision unit determines whether the paging message is the dummy message by comparing whether a sum of the correlation indices is greater than a threshold, wherein the threshold is associated with a channel fading level.

9. The communication device according to claim 6, wherein the simulation burst comprises N simulation bits, the first burst comprises N actual bits, N is a positive integer, t is an integer between 1 and N, $A_3$, $B_3$ are closeness parameters, $N_{real<0}$ is a number of N correlation indices with a negative real part, $N_{real<0}$ is a number of N correlation indices with a positive real part, and a third correlation ratio $X_3$ is computed based on following formulas:

$$A_3 = \frac{\sum (C(t)|_{real(C(t))<0})}{N_{real<0}},$$

$$B_3 = \frac{\sum (C(t)|_{real(C(t))>0})}{N_{real>0}},$$

$$X_3 = \frac{A_3 + B_3}{B_3};$$

and the decision unit determines whether the paging message is the dummy message by comparing whether an energy, an absolute value, or a real part of the third correlation ratio $X_3$ is greater than a threshold.

10. A method for controlling a communication device, comprising steps of:
(a) receiving a first burst of a paging message from a base station;
(b) generating a first simulation burst according to the first reference burst code and an estimated channel impulse response, wherein the estimated channel impulse response is associated with the communication channel for propagating the paging message;
(c) determining whether the paging message is a dummy message according to the first simulation burst and the first burst by correlating the first simulation burst and the first burst to generate a plurality of correlation indices, wherein C(t)=R(t)*conj(R'(t)), C(t) is the correlation indices, R(t) is the first burst, and R'(t) is the first simulation burst;
(d) stopping receiving the paging message when the paging message is determined to be the dummy message.

11. The method according to claim 10, further comprising:
generating a second simulation burst according to a second reference burst code and the estimated channel impulse response; and
determining whether the paging message is the dummy message in accordance with the second simulation burst and the first burst.

12. The method according to claim 11, further comprising:
requesting the communication device to continue receiving at least one subsequent burst of the paging message when the paging message is determined as not being the dummy message; and
determining whether the paging message is the dummy message in accordance with the at least one subsequent burst.

13. The method according to claim 10, wherein step of generating the first simulation burst further comprises:
modulating the first reference burst code to generate a modulated burst code; and
convolving the modulated burst code with the estimated channel impulse response to generate the first simulation burst; and
step of determining whether the paging message is the dummy message further comprises:
comparing the first simulation burst with the first burst to determine.

14. The method according to claim 10, wherein:
step of generating the first simulation burst further comprises:
convolving the first reference burst code with the estimated channel impulse response to form the first simulation burst;
step of determining whether the paging message is the dummy message further comprises:
demodulating the first burst to a demodulated burst; and
comparing the first simulation burst and the demodulated burst.

15. The method according to claim 10, wherein the first simulation burst comprises a plurality of simulation bits, and the first burst comprises a plurality of actual bits, and step of determining whether the paging message is the dummy message further comprises:

correlating the simulation bits and the actual bits to generate the plurality of correlation indices; and
   determining whether the paging message is the dummy message according to the plurality of correlation indices.

16. The method according to claim 15, wherein step of determining whether the paging message is the dummy message further comprises steps of:

determining whether the paging message is the dummy message according to a correlation ratio obtained from the plurality of correlation indices;
   wherein the correlation ratio is determined by a plurality of closeness parameters and the plurality of closeness parameters includes an average for a part of the correlation indices.

17. The method according to claim 16, wherein the first simulation burst comprises N simulation bits, and the first burst comprises N actual bits, and t is a positive integer between 1 and N, the N is a positive integer, $A_1$ and $B_1$ are closeness parameters, $N_{real>0}$ is a number of correlation indices with a positive real part, and the step (c) comprises:

generating a first correlation ratio $X_1$ according to the following formulas:

$$A_1 = \frac{\sum_{t=1}^{N} C(t)}{N},$$

$$B_1 = \frac{\sum (C(t)|_{real(C(t))>0})}{N_{real>0}},$$

$$X_1 = \frac{A_1}{B_1}; \text{ and}$$

determining whether the paging message is the dummy message by comparing whether an energy, an absolute value, or a real part of the first correlation ratio is greater than a threshold.

18. The method according to claim 16, wherein the first simulation burst comprises N simulation bits, the first burst comprises N actual bits, t is a positive integer between 1 and N, and N is a positive integer, and the step (c) comprises:

generating a second correlation ratio $X_2$ according to following formulas:

$$A_{21} = \frac{\sum (C(t)|_{real(C(t))<0\& img(C(t))>0})}{N_{real<0\& img>0}},$$

$$A_{22} = \frac{\sum (C(t)|_{real(C(t))<0\& img(C(t))<0})}{N_{real<0\& img<0}},$$

$$B_{21} = \frac{\sum (C(t)|_{real(C(t))>0\& img(C(t))>0})}{N_{real>0\& img>0}},$$

$$B_{22} = \frac{\sum (C(t)|_{real(C(t))>0\& img(C(t))<0})}{N_{real>0\& img<0}},$$

$$X_2 = \frac{A_{21} + A_{22} + B_{21} + B_{22}}{B_{21} + B_{22}}; \text{ and}$$

determining whether the paging message is the dummy message by comparing whether an energy, an absolute value or a real part of the second correlation ratio is greater than a threshold; and
   where $A_{21}$, $A_{22}$, $B_{21}$, $B_{22}$ are closeness parameters, and from the N correlation indices, $N_{real<0\&img>0}$ is a number of correlation indices with a negative real part and a positive imaginary part, $N_{real<0\&img<0}$ is a number of correlation indices with a negative real part and a negative imaginary part, $N_{real>0\&img>0}$ is a number of correlation indices with a positive real part and a positive imaginary part, and $N_{real>0\&img<0}$ a number of correlation indices with a negative real part and a negative imaginary part.

19. The method according to claim 16, wherein the step (c) comprises:

determining whether the paging message is the dummy message by determining whether a number of correlation indices with a positive real part from the correlation indices is greater than a threshold.

20. The method according to claim 16, wherein the step (c) comprises:

determining whether the paging message is the dummy message by determining whether a sum of the correlation indices is greater than a threshold, wherein the threshold is associated with a channel fading level.

21. The method according to claim 16, wherein the simulation burst comprises N simulation bits, the first burst comprises N actual bits, N is a positive integer, and t is an integer between 1 and N, wherein step (c) comprises:

a third correlation ratio $X_3$ is computed based on following formulas:

$$A_3 = \frac{\sum (C(t)|_{real(C(t))<0})}{N_{real<0}},$$

$$B_3 = \frac{\sum (C(t)|_{real(C(t))>0})}{N_{real>0}},$$

$$X_3 = \frac{A_3 + B_3}{B_3}; \text{ and}$$

and determining whether the paging message is the dummy message by comparing whether an energy, an absolute value or a real part of the third correlation ratio is greater than a threshold; and
   wherein $A_3$ and $B_3$ are closeness parameters, $N_{real<0}$ is a number of correlation indices with a negative real part, and $N_{real>0}$ is a number of correlation indices with a positive real part.

22. The method according to claim 16, further comprising:
   adjusting a threshold according to conditions of the communication channel;
   obtaining a predetermined value according to the correlation ratio; and
   comparing the threshold with the predetermined value to determine whether the paging message is the dummy message.

23. The method according to claim 10, further comprising:
   receiving at least one subsequent burst of the paging message when the paging message is determined as not being the dummy message;
   determining whether the paging message is more correlated with a second reference burst code according to the first burst code and the at least one subsequent burst; and substituting the second reference burst code for the first reference burst code when the paging message is more correlated with the second reference burst code.

* * * * *